E. T. HOPE.
STARTING MECHANISM LOCKING MEANS FOR AUTOMOBILES.
APPLICATION FILED MAY 16, 1913.
1,083,613.  Patented Jan. 6, 1914.
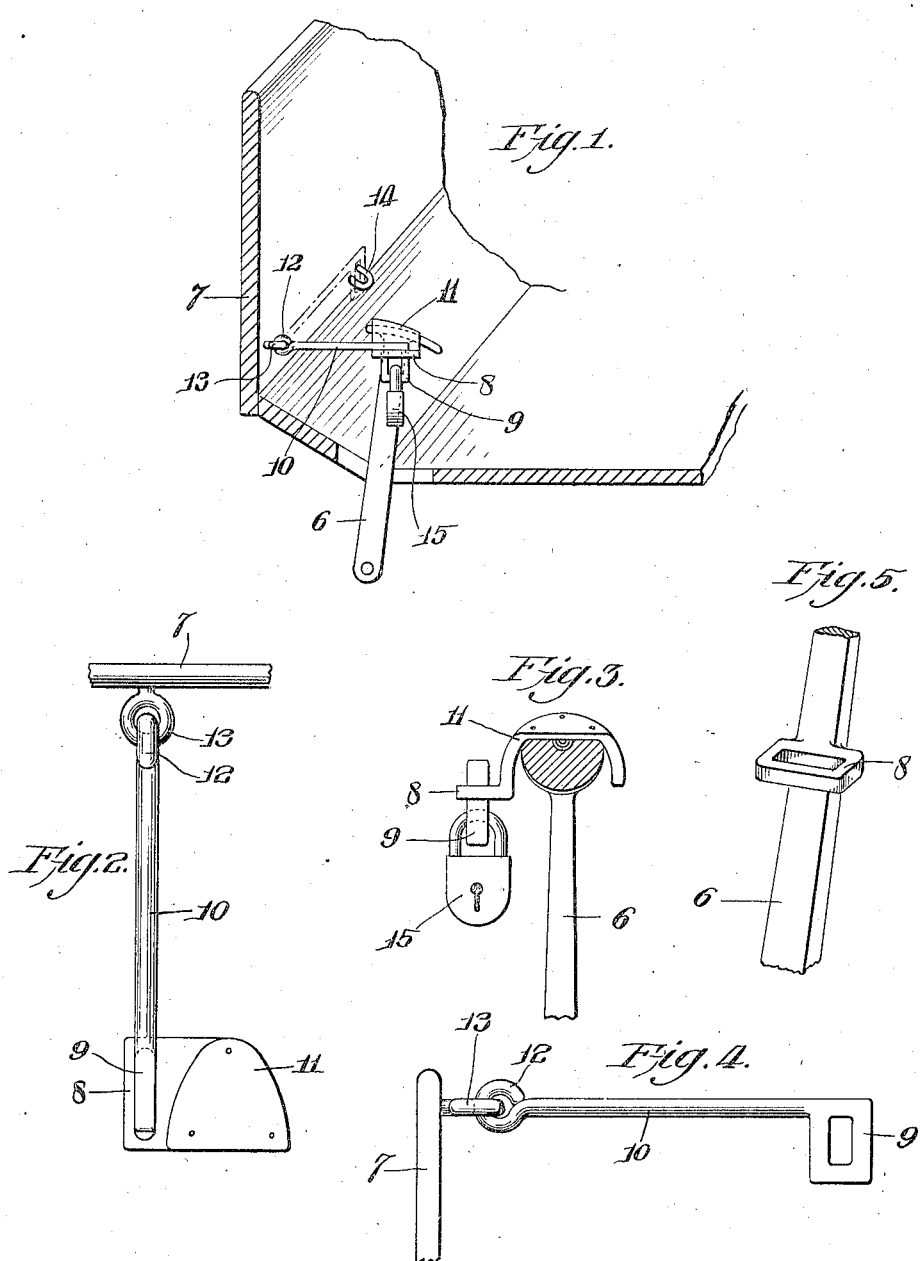
WITNESSES:
INVENTOR
Erwin T. Hope
BY
Chas. A. Cutter
ATTORNEY.

UNITED STATES PATENT OFFICE.

ERWIN T. HOPE, OF PHILADELPHIA, PENNSYLVANIA, ASSIGNOR TO ALBERT LEE HESTON, OF PHILADELPHIA, PENNSYLVANIA.

STARTING-MECHANISM-LOCKING MEANS FOR AUTOMOBILES.

1,083,613.     Specification of Letters Patent.     Patented Jan. 6, 1914.

Application filed May 16, 1913. Serial No. 767,978.

*To all whom it may concern:*

Be it known that I, ERWIN T. HOPE, a citizen of the United States, and a resident of the city and county of Philadelphia, State of Pennsylvania, have invented certain new and useful Improvements in Starting-Mechanism-Locking Means for Automobiles, of which the following is a specification.

My invention relates to improvements in means for locking the starting mechanism of an automobile so that there will be no danger of children or other unauthorized persons starting it up to the peril of themselves or others.

My invention is particularly applicable to that class of machine which is so arranged that the foot pedal, through which the operator controls the movements of the engine, is in neutral position when the car is brought to a stand and which can only be again started by operating this pedal to release the mechanism connecting the engine and the driving wheels of the car.

My invention consists in a means hereinafter claimed whereby the foot pedal may be locked in neutral position so that it cannot be released to couple the engine and the driving wheels of the car except by a person having a key to fit the locking device.

My invention is illustrated in the accompanying drawings which form part of this specification and in which similar letters of reference indicate similar parts throughout the several views and in which—

Figure 1, is a side elevation of the upper part of the controlling pedal of an automobile fitted with my improved locking device, part of the dash and part of the floor of the body of the machine being shown in section: Fig. 2, a plan of Fig. 1: Fig. 3, a rear elevation of Fig. 1: Fig. 4, a side elevation of lock bar for engaging the pedal: Fig. 5, a perspective view of part of a pedal carrying integrally the keeper for the lock bar.

6 is the pivoted oscillating operating pedal or lever of an automobile, 7 the dash board. The pedal carries a slotted keeper 8 which is adapted to receive the looped or slotted end 9 of a swinging lock bar 10 the other end of which is flexibly carried by some fixed part of the car, the dash board 7 for instance.

The keeper 8 may form part of the forging of the pedal 6 or it may be carried by a cap 11 which is adapted to be riveted to the top of the pedal as shown in Figs. 1, 2 and 3. The end of the lock bar next the dash board, or other part of the car to which it is secured, is furnished with an eye 12 which is carried by a staple or screw-eye 13 carried by the dash, this flexible attachment permits the lock bar to engage the keeper 8 on the pedal when the latter is to be locked in neutral position and, when the bar is out of use, to engage a suitable carrying means, a staple 14 for instance carried by the dash board as shown by dotted lines in Fig. 1. The looped part 9 of the lock bar 10 being passed through the keeper 8 on the pedal 6 a padlock 15 is employed to keep it in place. So long as the padlock 15 is in place the lock bar 10 prevents any movement of pedal 6 and effectually prevents the car from being started up by accident or design.

Having thus described my invention I claim as new and desire to secure by Letters Patent:—

1. An automobile lock comprising an oscillating operating lever provided with an elongated slotted keeper, and a swinging locking bar hinged at one end and provided with an elongated eye and adapted to swing into engagement at its free end with said keeper of the operating lever and form a rigid connection therewith and operative in engagement with said lever to hold it against oscillation in inoperative position.

2. An automobile lock, comprising an oscillative operative lever provided with a cap secured thereto and carrying a keeper and a swinging locking bar hinged at one end and provided at its free end with a slotted lug and adapted to swing to bring said slotted lug into close engagement with said keeper forming a rigid connection with said lever and operative to hold it against oscillation in unoperative position.

ERWIN T. HOPE.

Witnesses:
A. LEE HESTON,
DAVID A. HAMMOND.